United States Patent [19]

Feuling

[11] Patent Number: 4,913,884
[45] Date of Patent: Apr. 3, 1990

[54] URANIUM-PREEXTRACTION IN ZIRCONIUM/HAFNIUM SEPARATIONS PROCESS

[75] Inventor: Robert J. Feuling, Sandy, Utah

[73] Assignee: Westinghouse Electric Corp., Pittsburgh, Pa.

[21] Appl. No.: 268,101

[22] Filed: Nov. 9, 1988

[51] Int. Cl.$^4$ ............................................. C01G 43/00
[52] U.S. Cl. .......................................... 423/9; 423/8; 423/70; 423/79; 423/139
[58] Field of Search .................. 423/8, 9, 70, 79, 139

[56] References Cited

U.S. PATENT DOCUMENTS

| | | | |
|---|---|---|---|
| 3,223,476 | 12/1965 | Hart | 423/9 |
| 4,381,287 | 4/1983 | MacDonald et al. | 423/70 |
| 4,584,183 | 4/1986 | Chiang et al. | 423/70 |

*Primary Examiner*—Edward A. Miller
*Attorney, Agent, or Firm*—R. A. Stoltz

[57] ABSTRACT

This is an improvement to a process for making zirconium metal from uranium-containing zircon ore. The process being improved is of the type which utilizes a fluidized bed carbochlorination process of the zircon ore in which uranium chloride is volatilized at the ore chlorinator temperature and follows as an impurity in the zirconium-hafnium tetrachloride stream, and in which removal of iron impurities is performed by liquid-liquid iron extraction with methyl isobutyl ketone, and the zirconium-hafnium stream is further processed by a separations step to reduce the hafnium content to low levels by liquid-liquid hafnium extraction. The improvement comprises adding 1-9 weight percent quaternary ammonium halide (e.g. tricaprylmethylammonium chloride) to the methyl isobutyl ketone in the liquid-liquid iron extraction. In this manner, the methyl isobutyl ketone strips uranium and iron from the zirconium-hafnium stream chloride solution and thus uranium does not end up in the hafnium chlorinator residue and yield of hafnium can increase by recycling of the hafnium chlorinator residue. In addition, exposure of personnel to uranium is minimized, and production of relatively pure, marketable uranium hydroxide and essentially uranium-free zirconium oxide are made possible.

7 Claims, No Drawings

4,913,884

URANIUM-PREEXTRACTION IN ZIRCONIUM/HAFNIUM SEPARATIONS PROCESS

CROSS REFERENCE TO RELATED APPLICATIONS

This application is related to a co-pending application Ser. No. 07/292,035 filed 12/30/88, (W.E. Case #54593), which describes a process for extracting scandium from zircon ore. It utilizes feeding zircon sand to a fluidized bed chlorinator at 800°–1250° C. to produce a vaporous (principally zirconium and silicon chlorides) phase and a solid residue and recovering scandium from the solid residue (surprisingly the very low level of scandium present in zircon ore is concentrated in the residue rather than going with the vapor phase, where it would not be concentrated), making recovery of scandium from the zircon ore economically feasible. Generally, the process is part of the production of zirconium metal, whereby scandium is a byproduct of zirconium production.

Copending application Serial No. 121,012, filed Nov. 16, 1987, teaches a fabrication process to convert lanthanide ores into metal alkoxide precursors for advanced ceramics. It utilizes fluidized bed chlorination of a lanthanide ore followed by separation of at least one high value rare earth as a by-product, with the remaining rare earth mixture being processed into alkoxides and blended with zirconium alkoxide for fabrication of zirconia ceramic.

Related application Serial No. 121,016, filed Nov. 16, 1987, teaches fluidized bed chlorination of a lanthanide ore, a separation of a chloride of the rare earth superconducting component from other rare earth chlorides, reacting the rare earth superconducting component chloride to produce the alkoxide and mixing with alkoxides of other non-oxygen constituents of the superconductor to produce an alkoxide composite for processing into a superconductor.

BACKGROUND OF THE INVENTION

Zircon ore is used for the production of zirconium metal. The converting zircon ore (zircon sand) to zirconium metal generally utilizes the following operations: chlorination; separation (to remove hafnium); rechlorination (by processing similar to the initial chlorination); reduction; distillation ($MgCl_2$ and Mg vaporization for their removal from the zirconium); and double (or triple) arc melting to produce an ingot. The zirconium ingot can be then fabricated into various shapes.

With regard to chlorination, U.S. Pat. No. 4,244,935, issued to Dell on Jan. 13, 1981, relates a method of forming the chloride of a metal-oxygen containing substance based on a fluid coking technique. It should be noted that the commercial process for making zirconium metal utilizes fluidized bed carbochlorination process at about 12000° C. which produces a relatively impure, hafnium-containing zirconium tetrachloride and by-product silicon tetrachloride (which silicon tetrachloride by-product is relatively easily separated by differential condensation). U.S. Pat. No. 3,895,097, issued to Langenhoff et al. on July 15, 1975, also relates to a process for reacting metal oxides with chlorine. Uranium chloride is volatilized at the ore ("crude") chlorinator temperature and thus as an impurity in the zirconium-hafnium tetrachloride stream.

The step is required as naturally occurring zirconium generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconium-hafnium oxychloride thiocyanate complex solution using methyl isobutyl ketone, generally as described in U.S. Pat. No. 2,938,679, issued to Overholser on May 31, 1960, with the removal of iron impurities prior to solvent extraction as described in U.S. Pat. No. 3,006,719, issued to Miller on Oct. 31, 1961. Generally, the uranium impurity partitions between the zirconium stream and the hafnium stream, going principally into the hafnium stream.

Rechlorination (commonly called "pure chlorination"), as noted above, is by processing similar to the initial chlorination. The feed is zirconia (or hafnia), however, rather than the zircon ore, and the chlorination temperature is lower. As a result of the lower temperature, most of the uranium chloride is not volatilized during this chlorination, and generally remains in the residue, and is thus generally separated from the zirconium and hafnium streams.

Commercially, reduction is by reacting gaseous zirconium tetrachloride with molten magnesium to produce zirconium metal (in relatively porous, so-called "sponge", form). Modifications to the reduction process have been suggested in many U.S. Patents, including U.S. Pat. Nos. 4,440,384; 4,511,399; 4,556,420; 4,613,366; 4,637,831; and 4,668,287; assigned to the same assignee.

With regard to "distillation" to remove $MgCl_2$ and Mg (by their vaporization) from the zirconium sponge, such distillation is usually performed at about 1050°–1100° C. (note, however that Kwon et al in U.S. Pat. No. 4,711,664 teach that iron content can be lowered by distilling at about 934° C.).

Consumable electrode vacuum arc melting is generally used to produce a consolidated ingot from the porous distilled sponge (generally the distilled sponge is broken up and then pressed into disks, for example, which disks are then welded together to form the consumable electrode). An improved consumable electrode is described in Weber's U.S. Pat. No. 4,539,688.

Generally the hafnium is separately, but similarity processed through the reduction through melting stages, except that hafnium is generally melted in an electron beam furnace. In addition, as the uranium from the ore ends up principally in the solid residue of the pure chlorination of hafnium, the hafnium chlorinator residue contains about 5% uranium, which generally precludes recycling of the hafnium chlorination residue.

SUMMARY OF THE INVENTION

This is an improvement to a process for making zirconium metal from uranium-containing zircon ore. The process being improved is of the type which utilizes a fluidized bed carbochlorination process of the zircon ore at about 1000° C. which produces a relatively impure, hafnium-containing zirconium tetrachloride and by-product silicon tetrachloride, which silicon tetrachloride by-product is separated by differential condensation and in which uranium chloride is volatilized at the ore chlorinator temperature and follows as an impurity in the zirconium-hafnium tetrachloride stream, and in which zirconium-hafnium tetrachloride is mixed with water to produce a zirconium-hafnium oxychloride solution and removal of iron impurities is performed by liquid-liquid iron extraction with methyl isobutyl ketone, and the zirconium-hafnium oxychloride solution is further processed by adding thiocyanate and by a separations step to reduce the hafnium content to low levels by liquid-liquid hafnium extraction of aqueous zirconium-hafnium oxychloride thiocyanate complex solution using methyl isobutyl ketone. The improvement comprises adding 1-9 (preferably 2-5) weight percent quaternary ammonium halide to the methyl isobutyl ketone in the liquid-liquid iron extraction. In this manner, the methyl isobutyl ketone strips uranium and iron from the zirconium-hafnium oxychloride solution and thus, in later processing, uranium does not end up in the hafnium chlorinator residue and, in addition, the yield of hafnium can be increased by recycling of the hafnium chlorinator residue. In addition, exposure of personnel to uranium is minimized, and production of relatively pure, marketable uranium hydroxide and essentially uranium-free zirconium oxide are made possible.

Preferably, the quaternary ammonium halide is tricaprylmethylammonium chloride, and after the methyl isobutyl ketone is used to strip iron and uranium from the zirconyl chloride solution, one molar HCl is used to strip the uranium from the methyl isobutyl ketone and then water or sulfate containing aqueous medium is used to strip the iron from the methyl isobutyl ketone (or after the methyl isobutyl ketone is used to strip iron and uranium from the zirconyl chloride solution, an aqueous medium, such as water, can be used to strip both the uranium and iron from the methyl isobutyl ketone).

DESCRIPTION OF THE PREFERRED EMBODIMENT

As noted above, zircon ore is used for the production of zirconium metal and the converting zircon ore to zirconium metal generally utilizes the following operations: chlorination, separation, rechlorination at a somewhat lower temperature, reduction, distillation, and double (or triple) arc melting to produce an ingot which can be then fabricated into various shapes.

Also as noted, the commercial process for making zirconium metal utilizes a fluidized bed carbochlorination process at about 1000° C. (800°-1250° C.) which produces a relatively impure, hafnium-containing zirconium tetrachloride and the uranium chloride is volatilized at the ore chlorinator temperature and thus follows as an impurity in the zirconium-hafnium tetrachloride stream. The zirconium-hafnium tetrachloride is generally mixed with water to form a zirconium-hafnium oxychloride solution. The iron in the zirconium-hafnium oxychloride solution has, in the past, been stripped using liquid-liquid iron extraction using methyl isobutyl ketone.

The improvement of this invention adds 1-9 weight percent quaternary ammonium halide to the methyl isobutyl ketone in the liquid-liquid iron extraction. In this manner, the methyl isobutyl ketone strips uranium as well as iron from the zirconyl chloride solution and thus the uranium does not end up in the hafnium chlorinator residue.

Prior to this invention, the residue of the hafnium chlorination generally contained about 5% uranium, and had to be disposed of, which was expensive not only because of the cost of handling uranium-containing waste, but also because of the loss of valuable hafnium (about 2% of total hafnium is lost in this manner). Now the yield of hafnium can be increased by recycling of the hafnium chlorinator residue. In addition, the exposure of personnel to uranium is minimized, as the uranium is removed from the product stream at an earlier point.

Preferably the quaternary ammonium halide is tricaprylmethylammonium chloride (which was used in the experiments), as it is generally less expensive than other quaternary ammonium halides. Typically, 5 weight percent tricaprylmethylammonium chloride gave good results (but cost can apparently be lowered by reducing the amount down to about 2%, for example). The degree of uranium removal, of course, depends on column operating conditions during the liquid-liquid iron extraction. As an example, 5% TCMAC W/V in MIBK in a single extraction of an equal volume of zirconyl chloride feed solution (containing 150 g/l $Z_r$ and 75 g/l Hcl) at 20° C. extracts 93% of this uranium originally present.

Further, the production of relatively pure, marketable uranium hydroxide was demonstrated by the experiments. After the methyl isobutyl ketone was used to strip iron and uranium from the zirconyl chloride solution, one molar HCl was used to strip the uranium from the methyl isobutyl ketone. Uranium hydroxide (99% pure) was then precipitated by addition of ammonia. Then water was used to strip the iron from the methyl isobutyl ketone stream, allowing the methyl isobutyl ketone to be recycled. Alternately, after the methyl isobutyl ketone is used to strip iron and uranium from the zirconyl chloride solution, an aqueous medium (deionized water or other non-acidic medium) could used to strip both the uranium and iron from the methyl isobutyl ketone (the uranium and iron could then be later separated, if desired).

With the exception of the early removal of uranium and the resultant lower exposure of personnel, the processing of the zirconium and hafnium after the iron removal (the separation, rechlorination at a temperature of about 400° C., reduction, distillation, and multiple arc melting to produce an ingot which can be then fabricated into various shapes) remains essentially the same as in current processing.

This invention can also be used with processes where the zirconium values are recovered from zircon ore to make zirconia or hafnia, rather than metallic products. In addition, it can be used to make zirconium-hafnium oxide (without the separations and rechlorination steps). This can be important as, without the purifications of later processing, the uranium level of such oxides can be relatively high.

Generally, in past processes, the uranium impurity partitioned between the zirconium stream and the hafnium stream, going principally into the hafnium stream. As noted, rechlorination of the separate streams generally is by processing similar to the initial chlorination. The chlorination feed containing the predominant amount of uranium has been hafnia (rather than zirconia, which has been essentially parallel processed, but with much less uranium), and the operating temperature is lower than that of the zircon ore chlorination. As a result of the lower temperature, most of the uranium chloride was not volatilized during this hafnia chlorination, and remained in the residue. Uranium in the zirconium stream is less, but is similarity reduced during chlorination. It should be noted that these processes continue to reduce uranium in the improved process, and thus the uranium in the products will be extremely low.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. In a process for recovering zirconium values from uranium containing zircon ore, said process comprising a fluidized bed carbochlorination of the zircon ore at about 1000° C., producing a relatively impure, hafnium-containing zirconium tetrachloride stream and by-product silicon tetrachloride, with silicon tetrachloride by-product is separated by differential condensation, and wherein uranium chloride is volatilized at the ore chlorinator temperature and follows as an impurity in the zirconium-hafnium tetrachloride stream, mixing the zirconium-hafnium tetrachloride with water to produce a zirconium-hafnium oxychloride solution, removing iron impurities by liquid-liquid iron extraction with a methyl isobutyl ketone extractant, adding thiocyanate to the zirconium-hafnium oxychloride solution to produce an aqueous zirconium-hafnium oxychloride thiocyanate complex solution, and performing a separation step to reduce the hafnium content to low levels by liquid-liquid hafnium extraction of aqueous zirconium-hafnium oxychloride thiocynate complex solution using methyl isobutyl ketone; the improvement comprising:

adding 1-9 weight percent quaternary ammonium halide to the methyl isobutyl ketone extractant in said liquid-liquid iron extraction; whereby the ethyl isobutyl ketone extractant strips uranium and iron from the zirconium-hafnium oxychloride solution and thus the uranium does not end up in the hafnium chlorinator residue; whereby the yield of hafnium can be increased by recycling of the hafnium chlorinator residue, the exposure of personnel to uranium is minimized, and the production of relatively pure, marketable uranium hydroxide and essentially uranium-free zirconium oxide are made possible.

2. The process of claim 1, wherein said quaternary ammonium halide is tricaprylmethylammonium chloride.

3. The process of claim 1, wherein after the methyl isobutyl ketone extractant is used to strip iron and uranium from the zirconyl chloride solution, one molar HCl is used to strip the uranium from the methyl isobutyl ketone extractant and then water is used to strip the iron from the methyl isobutyl ketone extractant.

4. The process of claim 1, wherein after the methyl isobutyl ketone is used to strip iron and uranium from the zirconyl chloride solution, water of a sulfate containing aqueous medium is used to strip the uranium and iron from the methyl isobutyl ketone.

5. The process of claim 4, wherein said aqueous medium is water.

6. The process of claim 1, wherein 2-5 weight percent quaternary ammonium halide is utilized.

7. In a process for recovering zirconium values from uranium containing zircon ore, said process comprising a fluidized bed carbochlorination of the zircon ore at 800°-1250° C., producing a relatively impure, hafnium-containing zirconium tetrachloride stream and by-product silicon tetrachloride, which silicon tetrachloride by-product is separated by differential condensation, and wherein uranium chloride is volatilized at the ore chlorinator temperature and follows as an impurity in the zirconium-hafnium tetrachloride stream, mixing the zirconium-hafnium tetrachloride with water to produce a zirconium-hafnium oxychloride solution, and removing iron impurities by liquid-liquid iron extraction with a methyl isobutyl ketone extractant; the improvement comprising:

adding 1-9 weight percent quaternary ammonium halide to the methyl isobutyl ketone extractant in said liquid-liquid iron extraction; whereby the methyl isobutyl ketone extractant strips uranium and iron from the zirconium-hafnium oxychloride solution.

* * * * *